United States Patent [19]

Watanabe et al.

[11] Patent Number: 4,923,308

[45] Date of Patent: May 8, 1990

[54] PROCESS FOR DETERMINING THE DISTRIBUTION OF TEMPERATURES AT SURFACES OF HIGH TEMPERATURE MEMBERS

[75] Inventors: Keiichiro Watanabe, Nagoya; Tadaaki Matsuhisa, Kasugai; Hiroaki Sakai, Nagoya, all of Japan

[73] Assignee: NGK Insulators, Ltd., Japan

[21] Appl. No.: 334,133

[22] Filed: Apr. 6, 1989

[30] Foreign Application Priority Data

Apr. 13, 1988 [JP] Japan .................. 63-90915

[51] Int. Cl.⁵ .......................................... G01K 11/00
[52] U.S. Cl. ........................... 374/137; 374/142; 374/159; 374/210; 374/141
[58] Field of Search .............. 374/100, 137, 26, 141, 374/142, 159, 210; 204/422, 423

[56] References Cited

U.S. PATENT DOCUMENTS

| | | | |
|---|---|---|---|
| 3,652,427 | 3/1972 | Flood et al. | 204/422 |
| 3,891,512 | 6/1975 | Jackson | 204/422 |
| 3,935,079 | 1/1976 | Fitterer et al. | 73/19 |
| 4,133,036 | 1/1979 | Watson | 136/234 |
| 4,223,549 | 9/1980 | Kitzinger | 374/140 |

FOREIGN PATENT DOCUMENTS

| | | | |
|---|---|---|---|
| 62-81560 | 4/1987 | Japan | 204/422 |
| 640198 | 2/1979 | U.S.S.R. | 204/422 |
| 892284 | 12/1981 | U.S.S.R. | 374/26 |

OTHER PUBLICATIONS

Russell, C. K. et al., "Probing For More Than Temperature", Journal of Metals, vol. 23, No. 11, pp. 44-47 (Nov. 1971).

Primary Examiner—Allan N. Shoap
Assistant Examiner—Diego F. F. Gutierrez
Attorney, Agent, or Firm—Arnold, White & Durkee

[57] ABSTRACT

A process for determining a relative temperature distribution at a surface of a high temperature member to be used in a gas containing oxygen at high temperatures is disclosed. The process comprises the step of determining the relative surface temperature distribution of the member by measuring concentrations of oxygen at the surface of the member, which surface is composed of silicon carbide or silicon nitride. The process may also include the step of quantitatively determining a distribution of temperatures at the surface of the member by measuring concentrations of oxygen at the surface of the member, determining a relationship between temperatures and concentrations of oxygen on a surface of a standard member, and comparing the measured oxygen concentrations at the surface of the member with those of a standard member with reference to this relationship.

3 Claims, 2 Drawing Sheets

PROCESS FOR DETERMINING THE DISTRIBUTION OF TEMPERATURES AT SURFACES OF HIGH TEMPERATURE MEMBERS

Background of the Invention (1) Field of the Invention:

The present invention relates to a process for determining the distribution of temperatures occurring at the surface of a member under motion or at the surface of the member used in an environment of a high temperature fluid.

(2) Related Art Statement:

Heretofore, in order to determine the temperature distribution at the surface of a member, there has been a process available for measuring temperatures by a thermocouple fixed to given portions of the member, and a process available for determining such a temperature distribution by means of a photothermometer.

However, since the former process requires the fixing and wiring of numerous thermocouples to evaluate the temperature distribution, this process cannot be applied to moving members or members used in a high temperature fluid environment.

On the other hand, according to the latter process, the member needs to be positioned such that it may directly be observed. Thus, this process cannot be applied to members used in actual machines or those used in the high temperature-high pressure fluid environment.

SUMMARY OF THE INVENTION

Under the circumstances, the present inventors have made various studies to discover a process capable of determining the temperature distribution of members in a high temperature environment or even those under motion, and the inventors have found out that the distribution of the concentrations of oxygen at the surface of a member which is composed of silicon carbide or silicon nitride at least at its surface portion substantially conforms to the relative distribution of temperatures at the surface. Consequently, the inventors have also discovered that the quantitative distribution of the surface temperatures can be determined by comparing the concentrations of oxygen at a standard sample with those of the test member. As a result, the present inventors have reached the invention.

That is, according to the present invention, a process is provided for determining the distribution of temperatures at the surface of a high temperature member used in a high temperature gas containing oxygen, wherein the process is characterized in that the relative surface temperature distribution of the member is determined by measuring the concentrations of oxygen at a surface of the member, wherein the surface is composed of silicon carbide or silicon nitride.

According to the present invention, another process is provided for determining the distribution of temperatures at the surface of a high temperature member used in a high temperature gas containing oxygen, which process comprises the steps of determining the quantitative distribution of temperatures at the surface of the member by measuring the concentrations of oxygen at the surface of the member, wherein the surface is composed of silicon carbide or silicon nitride, and comparing the thus measured surface oxygen concentrations with those of a standard member.

The fundamental idea of the present invention is based on the discovery that as mentioned above, the distribution of concentrations of oxygen at the surface of the member which is composed of silicon carbide or silicon nitride at least at the surface portion thereof corresponds to the relative surface temperature distribution of the member, and that the quantitative surface temperature distribution can be determined by comparing the surface oxygen concentrations of the member with those of a standard member, which the relationship between the temperatures and concentrations of oxygen on the surface of the standard member have already been determined.

These and other objects, features and advantages of the invention will be appreciated upon reading of the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein.

DETAILED DESCRIPTION OF THE INVENTION

Figure 1:
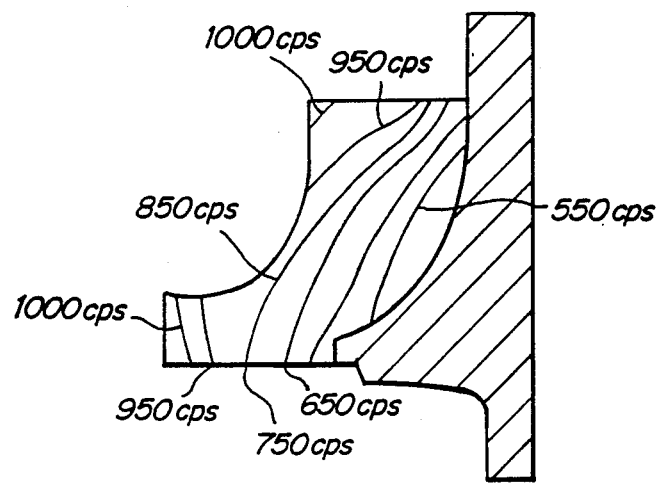
FIG. 1 is a view of a part of a radial type turbine wheel made of silicon carbide for a turbocharger for illustrating the oxygen concentration distribution thereof.

The present inventors have made various examinations from various aspects, and found out the above-mentioned fundamental technical idea.

In the above, the standard sample means a member which is made of the same material as that of a member of which the actual surface temperature distribution is to be measured and which is to be treated under the same conditions as those of the member.

Concretely speaking, in the present invention, a process for converting the surface oxygen concentrations to actual surface temperatures based on the Arrhenius-'equation is conveniently employed as the process for comparing the surface oxygen concentrations of the standard sample with those of the test member. However, the invention is not limited to this converting process. Any process may be employed so long as it can make conversion between the surface oxygen concentrations and the surface temperatures according to a constant relationship.

Members to which the present invention may be applied must be members in which at least surfaces are constituted by silicon carbide or silicon nitride. More specifically, the invention may be applied to members which are entirely made of silicon carbide or silicon nitride, or those which are covered with silicon carbide or silicon nitride at their surfaces only. In the case of the members of which surfaces only are covered with silicon carbide or silicon nitride, any materials, for instance, ceramics such as silicon nitride or metallic materials, may be used as their interior materials, so long as they exhibit good heat resistance.

For the following reasons, the oxygen concentrations at the surfaces of the members are measured by irradiating electron beams upon the surfaces of the members, and measuring the intensity of characteristic X rays of oxygen generated thereby.

Silicon carbide or silicon nitride is oxidized at the surface in a high temperature atmosphere containing oxygen, and a very thin oxidized film is formed in a thickness of not more than 1 μm. The formation speed of this oxidation film depends upon the temperature of the atmosphere and the oxygen partial pressure. The thickness of the film increases with the lapse of time. Therefore, it may be considered that differences in the oxidized film thickness correspond to differences in temperatures with respect to members which have been used under the same oxygen partial pressure for an equal time period.

On the other hand, the depth at which the electron rays irradiated enter the surface portion of the member is about 1 μm, and the intensity of the oxygen characteristic X rays generated at that time is proportional to the thickness of the oxidized film, if the film thickness is not more than 1 μm.

As is understood from the above, the measurement of the intensity of the characteristic X rays of oxygen results in the determination of the thickness of the oxidized film. This thickness is a function of the temperature of the atmosphere, the partial pressure of oxygen, and the exposed time period. Therefore, if the oxygen partial pressure and the exposed time are kept constant, the surface temperature distribution of the member can be known by the thickness of the oxidized film.

The present invention is characterized in that silicon carbide or silicon nitride which can be used stably in the oxidizing atmosphere, which affords a sufficient strength as a structural body, and which can form a thin oxidized film which is firm and stable and sensitive to temperatures in a thickness of not more than 1 μm is used as a temperature index, and that a process for measuring the intensity of the characteristic X rays of oxygen by irradiating electron rays is used as a means for measuring the temperature index.

As materials exhibiting the above properties, silicon carbide sintered bodies, silicon carbide coatings and silicon nitride coatings are preferred. Since silicon nitride sintered bodies contain an integranular phase exhibiting a high oxidation speed to form an oxidized film of more than 1 μm, they are unsuitable for the measuring process according to the present invention in some cases.

As processes for forming silicon carbide coatings or silicon nitride coatings, chemical vapor deposition or physical vapor deposition is suitable. However, the present invention is not limited to these processes, so long as a dense film can be formed.

As the process for measuring the intensity of the characteristic X rays by irradiating electron beams, for instance, an electron probe microanalyzer (hereinafter referred to as "EPMA") is preferably used.

The present invention may be applied to members to be used in an environment in a high temperature range of about 400 to 1,800° C. If the member is used at a temperature below 400° C., the speed at which the member is oxidized is slow, and consequently, the intensity of the X-rays irradiating the oxide film are insufficient for accurate measurement. If the member is used at a temperature above 1,900° C., the oxidizing speed is too fast, and consequently, X-ray measurement is made impossible because an oxidized film of greater than 1 μm readily occurs. No limitation is posed upon pressure under which the members are to be placed.

Although the present invention will be explained in more detail with reference to specific examples, the invention is not limited thereto.

(EXAMPLE 1)

A radial type turbine wheel for a turbocharger was prepared from silicon carbide, and was assembled into a test engine. After the turbine wheel was driven for 10 hours in a stationary state, it was removed from the engine. After the test, the silicon carbide turbine wheel was cut in the form of a vane element with a diamond cutter, and oxygen concentrations were measured by EPMA for the entire surface which was oxidized with high temperature test engine gases. The concentrations of oxygen were given by intensities (number of counts: cps) of the characteristic oxygen X rays generated when electron beams were irradiated upon the surface of silicon carbide. FIG. 1 shows the oxygen concentration distribution in which portions having the same intensities of the characteristic X rays of oxygen are connected by respective contour lines. This distribution conforms to the pattern of the surface temperature distribution. In this manner, the relative surface temperature distribution of the silicon carbide turbine wheel at high temperature and high speed during the testing of the engine could be determined.

(EXAMPLE 2)

Figure 2:
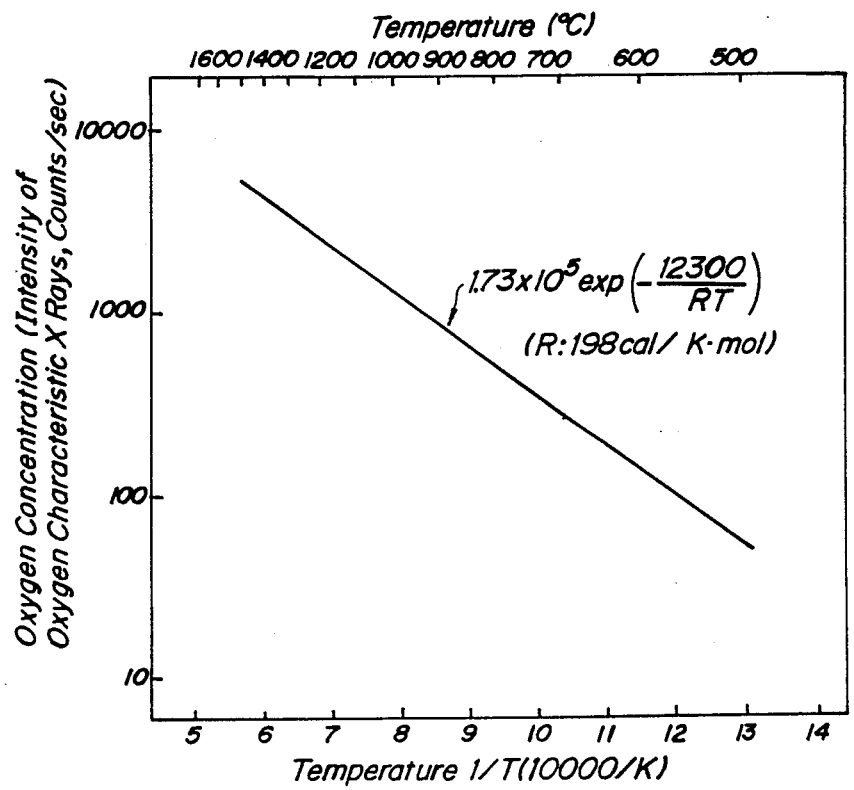
FIG. 2 is a graph showing the relationship between the oxygen concentration and the temperature.

In order to quantitatively determine the temperatures of the member in Example 1, a test piece made of the same material as that of the silicon carbide turbine wheel prepared in Example 1 was fixed in the test engine gas stream, and was driven for 10 hours while the temperature of the test piece was being measured by a thermocouple. As shown in FIG. 2, the relationship between the oxygen concentration and the temperature was obtained by plotting, according to the Arrhenius-'equation, the average temperatures during the operation for 10 hours and the oxygen concentrations at the surface of the test piece measured in the same manner as in Example 1. This relationship is expressed by the following equation 1.

$$C = 1.73 \times 10^5 \exp\left(-\frac{12,300}{RT}\right) \quad 1$$

in which C, R and T are the intensity of the characteristic X rays of oxygen (unit: counts/sec), the gas content, and the absolute temperature, respectively. In this equation 1, for instance, the intensity of the characteristic X rays of oxygen being 1,000 counts/second corresponds to the absolute temperature of 1,206° K (933° C.). By using the equation 1, the distribution of the oxygen concentrations in the silicon carbide turbine wheel in Example 1 can be converted to the temperatures.

Figure 3:
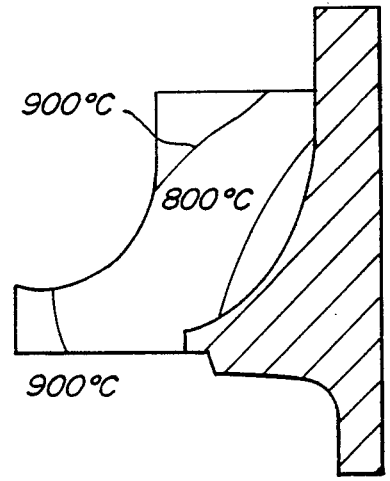
FIG. 3 is a view of a part of a radial type turbine wheel made of silicon carbide for a turbocharger illustrating the temperature distribution thereof.

In this way, the surface temperature distribution in the high temperature-high speed rotary member could be quantitatively known during the testing of the engine as shown in FIG. 3.

(EXAMPLE 3)

A metallic radial type turbine wheel for a turbocharger was prepared, and a coating of silicon carbide was formed thereon in a thickness of 10 μm by physical vapor deposition. The silicon carbide-covered metallic turbine wheel was assembled into a test engine in the same manner as in Example 1. After the testing, it was removed from the engine, and was cut in the form of a vane element with a diamond cutter, and oxygen concentrations were measured by EPMA for the entire surface. Thereby, the surface temperature distribution of the rotary member at high temperatures and high speed during the testing of the engine could be determined.

(EXAMPLE 4)

In order to quantitatively determine the temperatures of the member in Example 3, a test piece made of the same material as that of the metallic turbine wheel prepared in Example 3 in which coating was effected with a film made of silicon carbide in a thickness of 10 μm was fixed in the test engine gas stream. The test piece was subjected to an exposure test with the test engine gas stream, while the temperature of the test piece was being measured with a thermocouple.

Then, the relationship between the concentration of oxygen and the temperature was obtained in the same manner as in Example 2, and the quantitative surface temperature distribution of the metallic turbine wheel in Example 3 could be determined.

(EXAMPLE 5)

A radial type turbine wheel for a turbocharger was prepared from silicon nitride, and a coating of silicon carbide was formed in a thickness of 10 μm on the surface thereof by chemical vacuum deposition. The silicon carbide-coated turbine wheel was assembled into the test engine in the same manner as in Example 1. After the test, the turbine wheel was removed from the engine, and was cut in the form of a vane element. Then, the oxygen concentrations were measured over the entire surface by EPMA. Thereby, the surface temperature distribution in the member at high temperature and high speed during the testing of the engine could be determined.

(EXAMPLE 6)

In order to quantitatively determine the temperatures of the member in Example 5, a test piece made of the same material as that of the silicon nitride turbine wheel having the surface coated with the film of silicon carbide in a thickness of 10 μm in Example 5 was fixed in the engine test gas stream. While the temperature of the test piece was being measured, it was submitted to an exposure test with the test engine gas stream at high temperatures.

Then, the relationship between the oxygen concentration and the temperature was obtained in the same manner as in Example 2, and the quantitative surface temperature distribution of the turbine wheel made of silicon nitride in Example 5 was determined.

(EXAMPLE 7)

A radial type turbine wheel for a turbocharger was prepared from silicon nitride, and a coating of silicon nitride was formed on the surface thereof in a thickness of 10 μm by chemical vapor deposition. The silicon nitride-coated turbine wheel was assembled into the test engine in the same manner as in Example 1. After the test, the turbine wheel was removed, and cut in the form of a vane element, and oxygen concentrations were measured over the entire surface by EPMA. Thereby, the surface temperature distribution of the member at high temperature and high speed during the testing of the engine could be measured.

(EXAMPLE 8)

In order to quantitatively determine the temperatures of the member in Example 7, a test piece made of the same material as that of the silicon nitride turbine wheel having the surface covered with the 10 μm film of silicon nitride in Example 5 was fixed in the test engine gas stream. While the temperature of the test piece was being measured by a thermocouple, the test piece was subjected to an exposure test with the high temperature test engine gas stream.

Then, the relationship between the oxygen concentration and the temperature was obtained in the same manner as in Example 2, and the quantitative surface temperature distribution of the silicon nitride turbine wheel in Example 7 was determined.

(EXAMPLE 9)

In order to determine the surface temperature distribution in a stator to be used in an automobile gas turbine, the stator was prepared from silicon carbide, and then assembled into an actual machine. After a rated operation was performed for 24 hours, the stator was removed. After the test, the oxygen concentration at the entire surface of the silicon carbide stator which was oxidized with the gas turbine-combustion gas was measured by EPMA.

The oxygen concentration distribution thus obtained corresponds to the temperature distribution of the stator, and thus the surface temperature distribution of the member in the high temperature combustion gas atmosphere as in the gas turbine could be determined.

(EXAMPLE 10)

In order to quantitatively determine the temperature of the member in Example 9, a test piece made of the same material as the silicon carbide stator prepared in Example 9 was fixed in the gas turbine combustion gas stream. While the temperature of the test piece was being measured by a thermocouple, operation was performed for 24 hours. The average temperature and the oxygen concentrations at the surface of the test piece during the 24 hour operation were plotted according to the Arrhenius' equation. Thus, the quantitative surface temperature distribution in the member in the high temperature combustion gas atmosphere could be determined based on the relationship between the oxygen concentrations and the temperatures thus obtained.

As detailed above, according to the temperature distribution-measuring process of the present invention, the surface temperature distribution can be determined in the atmosphere containing oxygen at high temperatures and for non-stationary members under high speed motion.

Data thus obtained with respect to the surface temperature distribution of actual members in the environment of the actual machines are precious data which are indispensable for the designing of the members. Further, the data enable presumption of the coefficients of heat transfer of the members on the atmosphere.

What is claimed is:

1. A process for determining a relative temperature distribution at a surface of a high temperature member used in a gas containing oxygen at high temperatures, said process comprising the step of determining the relative temperature distribution at the surface of the member by measuring concentrations of oxygen at the surface of the member, said member being composed of silicon carbide or being coated with silicon nitride or silicon carbide at least at a surface portion thereof.

2. A process for quantitatively measuring a temperature distribution at a surface of a high temperature member in a gas containing oxygen at high temperatures, said process comprising the steps of determining a quantitative distribution of temperatures at the surface of said member by measuring concentrations of oxygen at the surface of said member, said member being composed of silicon carbide or being coated with silicon nitride or silicon carbide at least at a surface portion thereof, determining a relationship between temperatures and concentrations of oxygen on a surface of a standard member, and comparing the measured oxygen concentration at the surface of said member with those of the standard member with reference to said relationship to determine the quantitative distribution of temperatures at the surface of said member.

3. A process according to claim 2, wherein said relationship is determined by using an Arthenius equation.

* * * * *